(12) United States Patent
Ise

(10) Patent No.: US 7,447,823 B2
(45) Date of Patent: Nov. 4, 2008

(54) DATA INPUT TERMINAL DEVICE

(75) Inventor: Yuichi Ise, Tokyo (JP)

(73) Assignee: SMK Corporation (JP)

( * ) Notice: Subject to any disclaimer, the term of this patent is extended or adjusted under 35 U.S.C. 154(b) by 64 days.

(21) Appl. No.: 11/563,328

(22) Filed: Nov. 27, 2006

(65) Prior Publication Data

US 2007/0162666 A1 Jul. 12, 2007

(30) Foreign Application Priority Data

Nov. 28, 2005 (JP) ............................. 2005-341391

(51) Int. Cl.
*G06F 13/14* (2006.01)
*G06F 13/00* (2006.01)

(52) U.S. Cl. .................. 710/305; 710/105; 710/17; 710/62; 710/36

(58) Field of Classification Search ............ 710/17–19, 710/36–38, 72–73, 62–63, 105–106, 305–316
See application file for complete search history.

(56) References Cited

U.S. PATENT DOCUMENTS

| | | | |
|---|---|---|---|
| 6,151,653 A * | 11/2000 | Lin et al. ................ | 710/305 |
| 6,260,084 B1 * | 7/2001 | Wilson et al. ........... | 710/38 |
| 6,922,748 B2 * | 7/2005 | Engler .................... | 710/313 |
| 7,039,750 B1 * | 5/2006 | Regula et al. ........... | 710/317 |
| 7,184,794 B2 * | 2/2007 | Hess et al. ............... | 455/559 |
| 2007/0005849 A1 * | 1/2007 | Oliver .................... | 710/72 |
| 2007/0042806 A1 * | 2/2007 | Stepanian ............... | 455/557 |
| 2007/0079019 A1 * | 4/2007 | Hu et al. ................. | 710/36 |
| 2007/0186019 A1 * | 8/2007 | Edirisooriya et al. .... | 710/107 |

FOREIGN PATENT DOCUMENTS

JP 2005-333224 A 12/2005

OTHER PUBLICATIONS

Patent Abstracts of Japan for JP2005-333224 published Dec. 2, 2005.

* cited by examiner

*Primary Examiner*—Christopher B Shin
(74) *Attorney, Agent, or Firm*—Darby & Darby P.C.

(57) ABSTRACT

A data input terminal device is configured to be connected via a communication cable with a host computer from one of two connectors each associated with a distinct communications interface. The data terminal input device is configured to select the appropriate communications interface without additional intervention by a user. An interface selecting means selects the appropriate communications interface by detecting a connection state between the host computer and one of the two communication interfaces, and selecting the appropriate communications interface based on the detection result.

10 Claims, 2 Drawing Sheets

DATA INPUT TERMINAL DEVICE

CROSS-REFERENCE TO RELATED APPLICATION

The present application claims priority under 35 U.S.C. §119 to Japanese Patent Application No. 2005-341391, filed Nov. 28, 2005, and which is hereby incorporated herein by reference in its entirety.

BACKGROUND OF THE INVENTION

The present invention relates to a data input terminal device such as a pointing device that is a peripheral device for a host computer and that outputs input operation data to the host computer. More specifically, the present invention relates to a data input terminal device that can be connected to a host computer using two types of communication interfaces: a UART interface and a USB interface.

Conventionally, serial communication is generally used for data communication between a host computer such as a personal computer and a data input terminal device connected to the host computer as a peripheral. In serial communication, data is sent and received using communication cables and connectors that are compatible with RS-232C, which is a communication standard from the Electronic Industries Alliance (EIA) or Arlington, Va. According to the RS-232C communication standard, byte data output, for example, from a parallel bus of a central processing unit (CPU) must be converted to serial bit streams, and serial bit streams must be converted to parallel byte data handled by the CPU. A UART (Universal Asynchronous Receiver Transmitter) is often equipped in the host computer or the data input terminal device for this purpose.

However, in recent years, sending and receiving data between a host computer and a data input terminal device using other interfaces, such as a Universal Serial Bus (USB), as supported by the USB Implementers Forum, Inc. of Portland, Oreg., or by another interface compliant with a different serial communication standard (for example, the IEEE 1394 or FIREWIRE standard supported by the 1394 Trade Association of Southlake, Tex.) is becoming more prevalent. In USB communication, interrupt transfers are performed where the host computer receives input operation data from the data input terminal device at a fixed interval that does not inconvenience the operator. This makes it possible to allow data to be sent without interrupt handling on the host computer side, making it especially widely used for connecting a pointing device such as a mouse or joystick to a host computer.

As described above, the UART interface and the USB interface follow different standards. Network modules can be used to send and receive data using either communication interface by providing both a UART interface and a USB interface (see, e.g., Japanese Laid-Open Patent Publication Number 2005-333224, page 4, line 22, through page 5, line 29, and FIG. 1)

FIG. 3 is a simplified block diagram of a network module 100 based on a short-range wireless communication system known as BLUETOOTH, as supported by the BLUETOOTH Special Interest Group (SIG) of Bellevue, Wash. A BLUETOOTH IC chip 101 is mounted on a module substrate 102. Four external connection terminals 103A, 103B, 103C, 103D are provided at an end of the module substrate 102, which respectively serve as a UART RTS terminal, a UART CTS terminal, a UART IN terminal or a USB D+ terminal, and a UART OUT terminal or a USB D− terminal.

To allow data to be sent and received from either a UART interface or a USB interface, the BLUETOOTH IC chip 101 is equipped with a UART RTS terminal 104A, a UART CTS terminal 104B, a UART IN terminal 104C, a UART OUT terminal 104D, a USB D+ terminal 104E, and a USB D− terminal 104F.

As the figure shows, the RTS terminal 103A and the CTS terminal 103B at the end of the module substrate 102 are connected to the corresponding RTS terminal 104A and CTS terminal 104B, respectively, of the BLUETOOTH IC chip 101. Also, the external connection terminal 103C which serves as both a UART IN terminal and a USB D+ terminal is switchably connected to the IN terminal 104C and the D+ terminal 104E of the BLUETOOTH IC chip 101 by way of a jumper 105a of a double-pole double-throw jumper selection switch 105. The external connection terminal 103D which serves as both a UART OUT terminal and a USB D− terminal is switchably connected to the OUT terminal 104D or the D− terminal 104F of the BLUETOOTH IC chip 101 by way of a jumper 105b of the switch 105.

In this conventional network module 100, the jumpers 105a, 105b can be switched to the UART IN terminal 104C and the UART OUT terminal 104D to allow sending and receiving of data to an external device by way of the UART interface. The jumpers 105a, 105b can be switched to the USB D+ terminal 104E and the USB D− terminal 104F to allow sending and receiving of data by way of the USB interface.

However, a manually operated switch 105 is necessary to select between the UART interface and the USB interface, increasing the number of parts as well as requiring the inconvenience of manually switching the jumpers 105a, 105b. In particular, this selection operation is especially inconvenient when the switch 105 on the network module 100 is installed inside the device, as shown in the figure. Also, since the selected state is not visible, the communication interface may be switched erroneously.

SUMMARY OF THE INVENTION

The object of the present invention is to overcome these problems and to provide a data input terminal device that makes it possible to automatically select a communication interface suited for the connection environment simply by connecting a communication cable suited for the connection environment with a host computer without requiring awareness of communication interface selection.

In order to achieve the object described above, a data input terminal device includes: a UART interface and a USB interface; and interface selecting means detecting a connection state between a host computer and either the communication interface or the communication interface, and based on results of the detection, selecting between the UART interface and the USB interface. The communication interface selected by the interface selecting means is used to send and receive data with the host computer.

If detection of a connection state of one of the communication interfaces indicates that it is connected to the host computer, that communication interface is selected by interface selecting means. Otherwise, the other communication interface is selected. Thus, by simply detecting the connection state of one communication interface, the communication interface that is connected to the host computer is selected.

In an alternate embodiment of the present invention, interface selecting means are used to disable the connection with the host computer through the USB interface when a Data Terminal Ready (DTR) terminal of a connector used by the UART interface indicates a connection with the host computer is active.

The state of the DTR terminal of the connector used by the UART interface always indicates the connection state of the host computer to the data input terminal device through the UART interface. Thus, if the DTR terminal is active, connection to the host computer through the USB interface is disabled, and data input/output is performed with the UART interface connected to the host computer. Preferably, if the DTR terminal state indicates that there is no connection through the UART interface, the USB interface is selected regardless of whether there is a connection to the host computer through the USB interface or not.

As a result of the present invention, a communication interface suited for the connection environment is selected simply by connecting a communication cable suited for the connection environment with the host computer. Thus, a communication cable can be connected without using a switch to make a selection manually and without requiring awareness of the communication interface to be used.

In the alternative embodiment of the present invention, the state of the DTR terminal of the connector used by the UART interface always indicates the connection state of the host computer and the data input terminal device through the UART interface. Thus, the communication interface suited for the connection environment with the host computer can be accurately selected.

The above, and other objects, features and advantages of the present invention will become apparent from the following description read in conjunction with the accompanying drawings, in which like reference numerals designate the same elements.

BRIEF DESCRIPTION OF THE DRAWINGS

The invention will become more readily apparent from the Detailed Description of the Invention, which proceeds with reference to the drawings, in which.

DETAILED DESCRIPTION OF THE INVENTION

Figure 1:
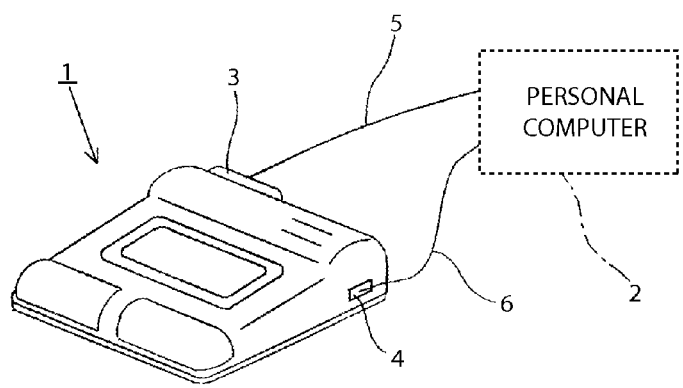
FIG. 1 is a simplified drawing showing how a data input terminal device 1 according to an embodiment of the present invention is connected to a host computer 2.

FIG. 1 is a simplified drawing providing an example showing how a data input terminal device 1 may be connected to a host computer 2. In this example, the data input terminal device 1, which is shown as a peripheral of the host computer 2, is a touch panel input device that sends relative movement data and instruction input data to the host computer 2 in response to input operations performed by the operator. On the outer surface of the data input terminal device 1 are provided connector openings for a parallel connector 3 used by a UART interface 10 compliant with the RS-232C standard and a USB connector 4 used by a USB interface 11 compliant with a serial communication standard (for example, USB 1.1). As shown in FIG. 1, a parallel cable 5 connected to the parallel connector 3 and/or a USB cable 6 connected to the USB connector 4 are connected to the host computer 2.

Figure 2:
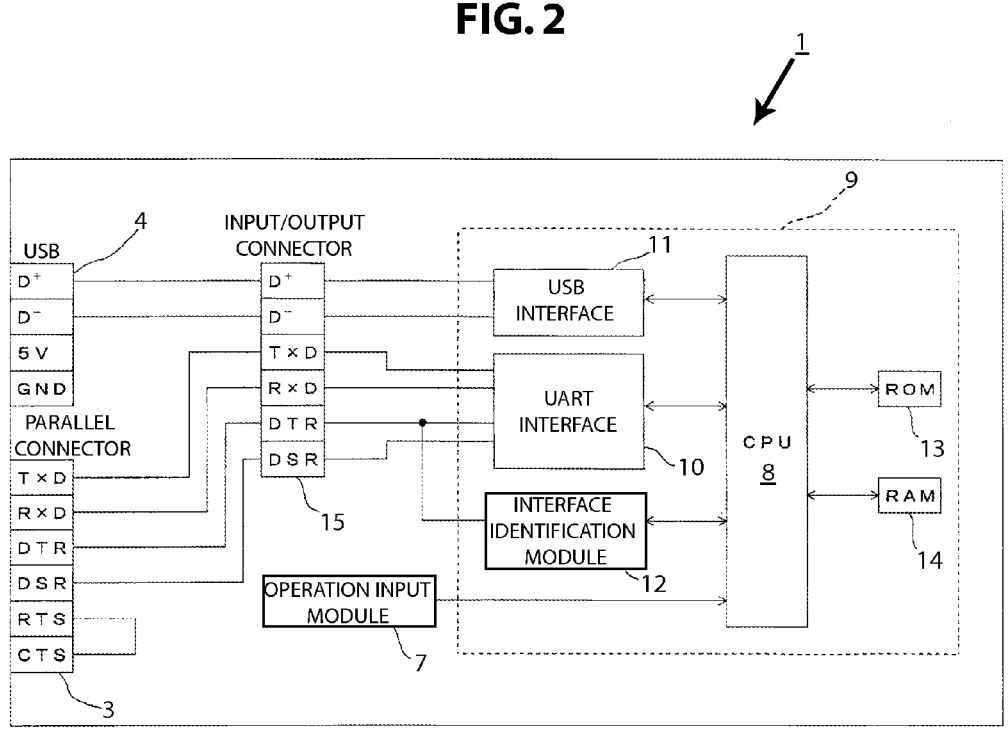
FIG. 2 is a block diagram of a data input terminal device 1.
Figure 3:
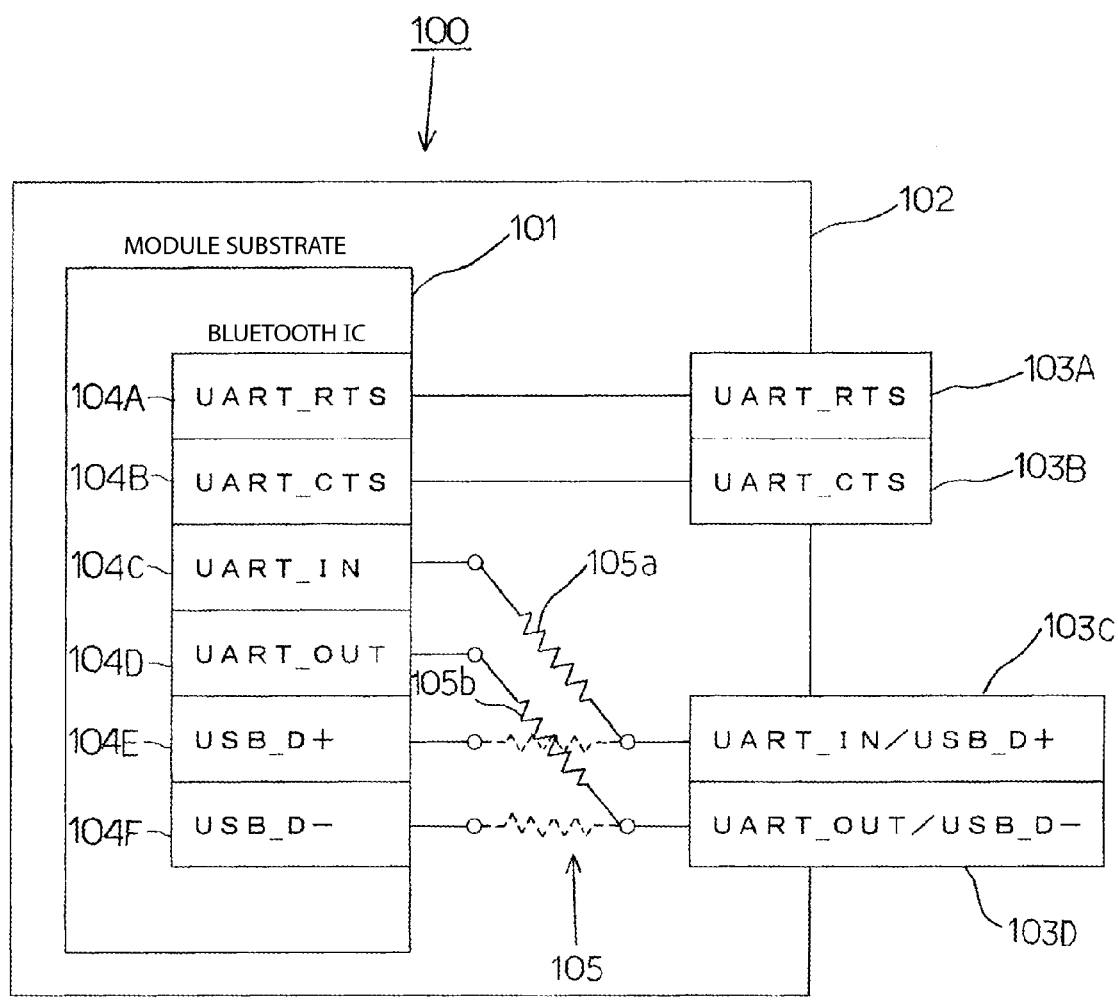
FIG. 3 is a simplified block diagram of a conventional network module 100.

As shown in FIG. 2, the parallel connector 3 is equipped with a TxD (transmit data) terminal, an RxD (receive data) terminal, a DTR (Data Terminal Ready) terminal, a DSR (Data Set Ready) terminal, an RTS (Request to Send) terminal, and a CTS (Clear to Send) terminal.

To facilitate description, the designators for these terminals are indicated as the corresponding terminal designators on the host computer 2 side to which they connect. Thus, the TxD terminal receives data output from the host computer 2 and the RxD terminal is used to output relative movement data and instruction input data from the data input terminal device 1 to the host computer 2. Also, the DTR terminal receives an "H" level detection signal through the parallel cable 5 from the host computer 2 when the host computer 2 starts up. When the data input terminal device 1 and the host computer 2 are in a connected state, an "L" level signal, indicating a connection, is sent from the DSR terminal to the host computer 2.

By receiving an "L" level signal from the DSR terminal, the host computer 2 confirms that the data input terminal device 1 is connected to the UART interface 10 that is compliant with the RS-232C standard and sets the DTR terminal to "L". Thus, the data input terminal device 1 and the host computer 2 are connected by way of the UART interface 10 when the DTR terminal is at the "L" level, and is not connected by way of the UART interface 10 when at the "H" level. Based on the state of the DTR terminal, the status of the connection through the UART interface 10 can be detected.

The RTS terminal and the CTS terminal are terminals for controlling the timing of data input and output between the data input terminal device 1 and the host computer 2. In this case, since control is performed through input and output of data rather than by means of control signals, the RTS terminal and the CTS terminal are shorted together (as illustrated in FIG. 2).

The USB connector 4 is equipped with four terminals: the D+ terminal and the D− terminal that can bi-directionally send and receive data; a +5V power supply terminal; and a GND (ground) terminal. The +5V power supply terminal and the GND (ground) terminal are used to supply power to a USB device through the USB interface when the device does not have other power supply input means, but these terminals are not used in the present example.

As shown in FIG. 2, the data input terminal device 1, which is a touch panel input device, is equipped with: an internal wiring input/output connector 15 that connects to the terminals corresponding to the terminals of the parallel connector 3 and the USB connector 4, not including the unused terminals described above; an operation input module 7 detecting input operations performed by the operator on the touch panel (not shown in FIG. 2); and a single-chip microprocessor 9 with input/output ports that connect to the internal wiring input/output connector 15 and the operation input module 7.

The microprocessor 9 includes: a CPU 8; the UART interface 10; the USB interface 11; an interface identification module 12; a ROM 13; and a RAM 14. These may be connected, for example, by a bus line. The ROM 13 stores a boot program read by the CPU 8 when the data input terminal device 1 starts up and an application program that controls the operation of the operation input module 7. The RAM 14 provides temporary storage for relative movement data and instruction input data detected from the operation input module 7. Based on the programs stored in the ROM 13, the CPU 8 controls the operations of the different modules described above, including the sending and receiving of data.

The UART interface 10 is connected to the TxD terminal, the RxD terminal, the DTR terminal, and the DSR terminal of the input/output connector 15. The UART interface 10 converts the serial bit stream received from the TxD terminal to parallel byte data handled by the CPU 8 and outputs the data to the bus line. Based on control from the CPU 8, byte data, such as relative movement data and instruction input data sent from the bus line, is converted to a serial bit stream and output to the RxD terminal.

Also, the USB interface 11 is connected to the D+ terminal and the D− terminal of the input/output connector 15, converts serial data received from one or both of these terminals to parallel data which is sent to the bus line, and converts byte data from the bus line such as relative movement data and instruction input data to serial data which is sent to the D+ terminal or the D− terminal. When acting as a USB device, the data input terminal device 1 is set up to respond to a default address "00h" in its initial state before it is assigned a fixed address by the host computer 2. The data input terminal device 1 then converts device information indicating what type of peripheral it is into serial data, which is then sent to the host computer 2 through the D+ terminal or the D− terminal. Based on this device information, the host computer 2 loads the associated driver (in this case a driver for a touch panel input device), assigns an address to the data input terminal device 1, and sends and receives data with the data input terminal device 1.

The interface identification module 12 connects to the DTR terminal of the input/output connector 15, and detects the connection status of the UART interface 10 from the state of the DTR terminal. More specifically, when the DTR terminal is at the "L" level, it is assumed that it is connected to the host computer 2 through the UART interface 10 and disables data input/output through the USB interface 11 regardless of whether there is a connection with the host computer 2 through the USB cable 6. Output of device information to the host computer 2 with the default address "00h" is disabled while the UART interface 10 is being used even if the host computer 2 and the data input terminal device 1 is connected by a USB cable 6. Thus, the host computer 2 will not recognize the data input terminal device 1 as a USB device, and the sending and receiving of data between the data input terminal device 1 and the host computer 2 will be performed through the UART interface 10, which is given priority.

When the UART interface 10 is not being used (i.e., when there is no connection with the host computer 2 with the parallel cable 5), the DTR terminal is in the "H" state, and the USB interface 11 is made active. With the connection to the host computer 2 through the USB cable 6, the device information of the touch panel input device is sent to the host computer 2, an address is assigned to the data input terminal device 1, and sending and receiving of data through the USB interface 11 is enabled.

As described above, the sending and receiving of data between the host computer 2 and the data input terminal device 1 is made possible without the operator being conscious of whether the UART interface 10 or the USB interface 11 is used by making the connection with the USB cable 6 or the parallel cable 5 based on the connection environment of the host computer 2.

Also as described above, connection through the USB interface 11 is disabled while the UART interface 10 is being used by not outputting device information from the USB interface 11 to the host computer 2. Alternatively, connection through the USB interface 11 may be disabled by blocking the connection of the D+ terminal and/or the D− terminal.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the present invention may be implemented such that connection through the UART interface 10 is disabled while the USB interface 11 is being used. In addition, the connection status of either interface may be detected based on the state of a terminal other than the DTR terminal. For example, the connection status of the USB interface 11 may be detected by detecting an increase in potential of the +5V power supply terminal of the USB connector 4 when the USB cable 6 is connected to the host computer 2.

The present invention as described above, for example, is suited for data input terminal devices that include a USB interface and a UART interface. Application to other types of data communication interfaces (for example, to IEEE 1394 FIREWIRE interfaces) is fully contemplated within the scope of the present invention.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

What is claimed is:

1. A data input terminal device comprising:
    a universal asynchronous receiver transmitter (UART) interface and a universal serial bus (USB) interface; and
    interface selecting means detecting a connection state between a host computer and either said UART interface or said USB interface, and based on results of said detection, selecting between said UART interface or said USB interface;
    wherein said selected interface is used to send and receive data with said host computer, and
    wherein said interface selecting means disables connection with said host computer through said USB interface when a Data Terminal Ready (DTR) terminal of a connector used by said UART interface indicates a connection with said host computer is active.

2. The data input terminal device according to claim 1, wherein the DTR terminal of the connector used by said UART interface is set by said host computer to provide a low ("L") level signal to said UART interface to indicate said active connection with said host computer.

3. The data input terminal device according to claim 1, wherein said interface selecting means detects that a connection between said UART interface and said host computer is inactive when the DTR terminal of the connector used by said UART interface is set by said host computer to provide a high ("H") level signal to said UART interface.

4. A data input terminal device comprising:
    a universal asynchronous receiver transmitter (UART) interface and a universal serial bus (USB) interface; and
    interface selecting means detecting a connection state between a host computer and either said UART interface or said USB interface, and based on results of said detection, selecting between said UART interface or said USB interface;
    wherein said selected interface is used to send and receive data with said host computer, and wherein the data terminal input device is a touch panel input device further comprising:
- a UART terminal for connecting said UART interface to said host computer;
- a USB terminal for connecting said USB interface to said host computer;
- a central processing unit (CPU) interconnected to at least one memory; and
- an operation input module interconnected to said CPU, said operation input module for detecting input operations performed on a touch panel wherein said interface selecting means comprises an operation input module interconnected to a Data Terminal Ready (DTR) terminal of the UART terminal and said CPU.

5. The data input terminal device according to claim 4, further comprising an input/output connector interconnecting said UART terminal to said UART interface and said USB terminal to said USB interface.

6. A data input terminal device comprising:
- a universal asynchronous receiver transmitter (UART) interface and a universal serial bus (USB) interface; and
- interface selecting means detecting a connection state between a host computer and either said UART interface or said USB interface, and based on results of said detection, selecting between said UART interface or said USB interface;
- wherein said selected interface is used to send and receive data with said host computer, and
- wherein said interface selecting means enables connection with said host computer through said USB interface when a Data Terminal Ready (DTR) terminal of a connector used by said UART interface indicates a connection with said host computer is inactive.

7. In a data input terminal having a universal asynchronous receiver transmitter (UART) interface and a universal serial bus (USB) interface, a method for selecting one of said UART interface and said US) interface, the method comprising the steps of:
- detecting a connection state between a host computer and said UART interface; and
- selecting between said UART interface or said (USB) interface based on results of said detection of the connection state; wherein said selected interface is used to send and receive data with said host computer,
- wherein said UART interface is selected when a Data Terminal Ready (DTR) terminal of a connector used by said UJART interface indicates a connection with said host computer is active.

8. The method according to claim 7, wherein said UART interface indicates a connection with said host computer is active when a Data Terminal Ready (DTR) terminal of a connector used by said UART interface is set by said host computer to provide a low ("L") level signal to said UART interface.

9. The method according to claim 7, wherein said USB interface is disabled by disabling transmission of a default address of said USB interface to said host computer.

10. The method according to claim 7, wherein said USB interface is disabled by blocking connections between one or more terminals of a connector used by said USB interface and said USB interface.

* * * * *